(12) United States Patent
Petit

(10) Patent No.: US 9,875,403 B2
(45) Date of Patent: Jan. 23, 2018

(54) METHOD FOR ACCURATELY GEOLOCATING AN IMAGE SENSOR INSTALLED ON BOARD AN AIRCRAFT

(71) Applicant: THALES, Courbevoie (FR)

(72) Inventor: Jean-Marie Petit, Bures sur Yvette (FR)

(73) Assignee: THALES, Courbevoie (FR)

( * ) Notice: Subject to any disclaimer, the term of this patent is extended or adjusted under 35 U.S.C. 154(b) by 483 days.

(21) Appl. No.: 14/651,166

(22) PCT Filed: Dec. 11, 2013

(86) PCT No.: PCT/EP2013/076235
§ 371 (c)(1),
(2) Date: Sep. 28, 2015

(87) PCT Pub. No.: WO2014/090878
PCT Pub. Date: Jun. 19, 2014

(65) Prior Publication Data
US 2016/0012289 A1    Jan. 14, 2016

(30) Foreign Application Priority Data

Dec. 12, 2012    (FR) .................................... 12 03381

(51) Int. Cl.
*G06K 9/00* (2006.01)
*G01C 21/00* (2006.01)
(Continued)

(52) U.S. Cl.
CPC ......... *G06K 9/00476* (2013.01); *B64D 47/08* (2013.01); *F41G 3/06* (2013.01);
(Continued)

(58) Field of Classification Search
CPC ............................ G06K 9/00476; G06F 15/00
See application file for complete search history.

(56) References Cited

U.S. PATENT DOCUMENTS

| 4,168,524 A | 9/1979 | Soltz et al. | |
|---|---|---|---|
| 4,689,748 A * | 8/1987 | Hofmann | G01C 11/025 348/116 |
| 5,054,917 A * | 10/1991 | Pepin | F41G 3/326 250/203.2 |
| 5,864,131 A * | 1/1999 | Wagers | B64G 1/66 250/203.6 |
| 6,064,942 A * | 5/2000 | Johnson | F41G 3/02 342/118 |
| 6,535,816 B1 * | 3/2003 | Smith | G01S 5/16 701/469 |

(Continued)

FOREIGN PATENT DOCUMENTS

WO    2011/159206 A1    12/2011

*Primary Examiner* — Alex C Dunn
(74) *Attorney, Agent, or Firm* — Baker & Hostetler LLP

(57) ABSTRACT

A method for geolocating an image sensor having an LoS and installed on board an aircraft. The geographical position of the sensor and the orientation of its LoS being approximate, it comprises: a step of creating an opportune landmark comprising the following substeps: an operator locating, on a screen for displaying acquired images, a stationary element on the ground, the axis of a telemeter being indicated in these images by means of a reticle the direction of which represents the LoS; the operator moving the LoS in order to place the reticle on this stationary element; tracking of this stationary element; estimating the approximate geographical position of this stationary element; searching in a terrain DB for the location corresponding to a zone centered on the stationary element; displaying an image of the terrain of this location, the operator locating the stationary element; and the operator pointing to this stationary element in the displayed terrain image, the geographical coordinates pointed to being retrieved from the terrain DB, this stationary element becoming an opportune landmark; and the sensor moving relative to the landmark, a step of accurately locating the sensor, from the geographical coordinates of this landmark and using a Kalman filter supplied with a plurality of measurements of the distance between the sensor and the landmark and with a plurality of measurements of the orientation of the LoS of the sensor toward the landmark, there being one orientation measurement for each telemetry measurement, simultaneously allowing the orientation of the LoS to be accurately estimated.

11 Claims, 4 Drawing Sheets

$\psi, \theta, \varphi$ : Orientation of the LoS (coordinate system)
$\sigma_{sensor}$ : Uncertainty in the geographic position of the sensor

(51) Int. Cl.
*F41G 3/06* (2006.01)
*F41G 3/22* (2006.01)
*F41G 3/32* (2006.01)
*B64D 47/08* (2006.01)
*G01B 11/14* (2006.01)
*G06F 17/30* (2006.01)
*G06K 9/46* (2006.01)
*G06K 9/52* (2006.01)
*G06T 7/20* (2017.01)
*G06T 7/60* (2017.01)
*G06T 11/60* (2006.01)
*H04N 5/232* (2006.01)
*G06T 7/73* (2017.01)

(52) U.S. Cl.
CPC ............... *F41G 3/22* (2013.01); *F41G 3/326* (2013.01); *G01B 11/14* (2013.01); *G01C 21/005* (2013.01); *G06F 17/3028* (2013.01); *G06K 9/46* (2013.01); *G06K 9/52* (2013.01); *G06T 7/20* (2013.01); *G06T 7/60* (2013.01); *G06T 7/73* (2017.01); *G06T 11/60* (2013.01); *H04N 5/23293* (2013.01); *H04N 5/23296* (2013.01); *G06K 2009/4666* (2013.01)

(56) References Cited

U.S. PATENT DOCUMENTS

| | | | | |
|---|---|---|---|---|
| 7,391,355 | B2* | 6/2008 | Mortimer | G01S 5/0018 |
| | | | | 342/107 |
| 7,437,058 | B2* | 10/2008 | Yanagita | G01S 19/14 |
| | | | | 386/239 |
| 8,477,190 | B2* | 7/2013 | Giuffrida | G01C 11/02 |
| | | | | 348/116 |
| 8,483,960 | B2* | 7/2013 | Smitherman | G01C 11/02 |
| | | | | 348/144 |
| 9,501,700 | B2* | 11/2016 | Loveland | G06K 9/00637 |
| 2006/0210169 | A1 | 9/2006 | Colestock et al. | |
| 2007/0010965 | A1* | 1/2007 | Malchi | G01C 3/06 |
| | | | | 702/151 |
| 2009/0216432 | A1* | 8/2009 | Svane | G01S 3/784 |
| | | | | 701/467 |
| 2012/0290152 | A1* | 11/2012 | Cheung | G01S 7/003 |
| | | | | 701/2 |
| 2013/0182238 | A1* | 7/2013 | Berthault | G01S 17/023 |
| | | | | 356/4.01 |
| 2017/0024904 | A1* | 1/2017 | Samarasekera | G06T 11/60 |

* cited by examiner

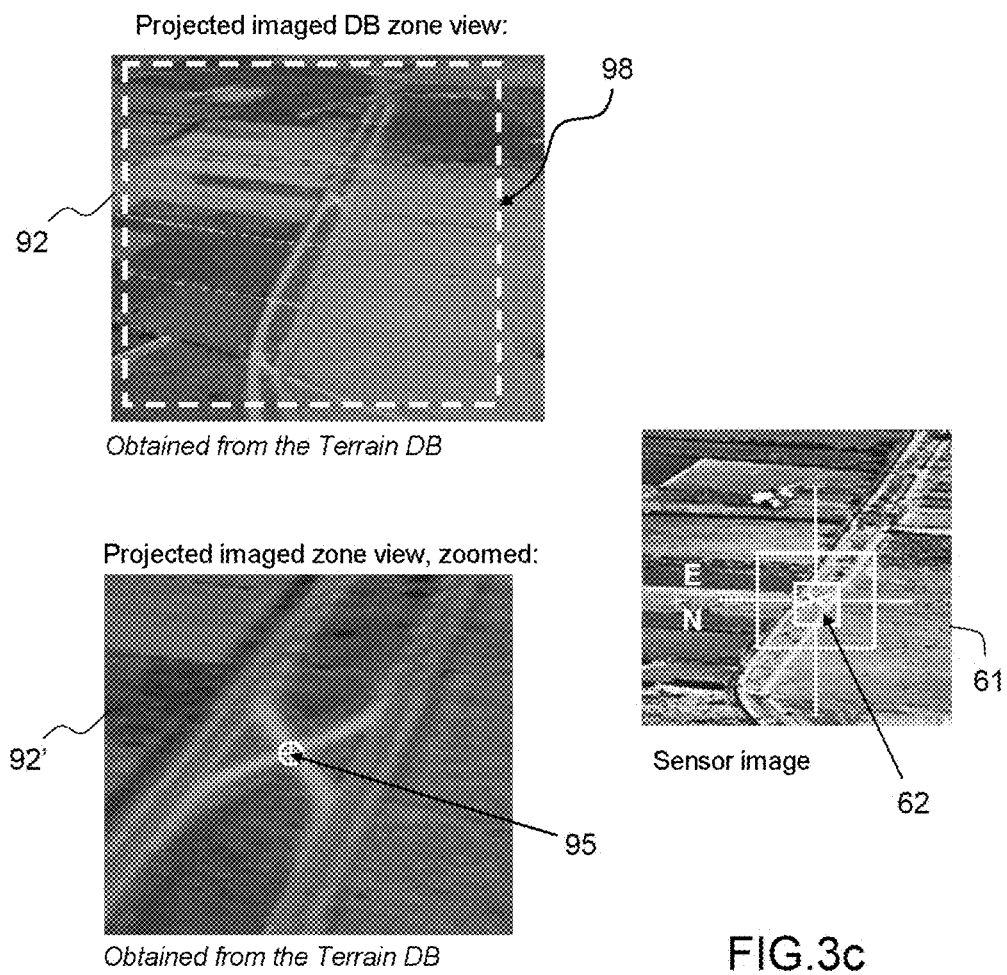
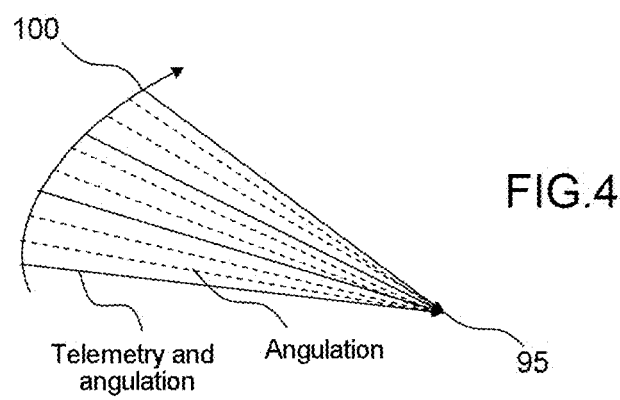
FIG.3c
FIG.4

METHOD FOR ACCURATELY GEOLOCATING AN IMAGE SENSOR INSTALLED ON BOARD AN AIRCRAFT

CROSS-REFERENCE TO RELATED APPLICATIONS

This application is a National Stage of International patent application PCT/EP2013/076235, filed on Dec. 11, 2013, which claims priority to foreign French patent application No. FR 1203381, filed on Dec. 12, 2012, the disclosures of which are incorporated by reference in their entirety.

FIELD OF THE INVENTION

The field of the invention is that of accurate location of an image sensor installed on board an aircraft when image capture conditions, i.e. the location (geographical position) and orientation of the image sensor, are available, the location of the sensor and possibly also its orientation being approximate.

BACKGROUND OF THE INVENTION

The image sensor comprises an imager, a telemeter, means for measuring the orientation of its LoS (line of sight) and means for tracking a stationary point on the ground.

The geographical position of an aircraft is not always sufficiently accurate or a fortiori that of the on-board sensor, because for example of inertial drift in the inertial measurement unit of the aircraft, in the absence of GPS. This drift may typically reach 1 nautical mile at the end of 1 h of flight, whereas a positional accuracy much less than 100 m is sought.

The accuracy to which the absolute orientation of the LoS is known is also generally unsatisfactory, i.e. greater than 3 mrd, for example in the following cases:
  In the case where the orientation of the LoS of the sensor is obtained from the contribution of the attitude of the aircraft, angles of incidence and feedback of the mechanical angles of the sensor, its accuracy is limited by unknown misalignments between the inertial measurement unit of the aircraft and the LoS of the sensor. Furthermore, these misalignments are in general different in-flight and on the ground, thereby making them difficult to calibrate.
  When the optronic sensor is not equipped with an inertial measurement unit (consisting of 3 gyrometers and 3 accelerometers) that could allow, if needs be, its attitude to be determined either autonomously or from inertial alignment with the a priori more accurate attitude of the aircraft. Or, if this is the case, its inertial sensors may be of unsatisfactory class, for reasons of available volume or cost.

A conventional means for improving the accuracy ("registration") of the geographical position of a sensor or that of the orientation of its LoS relative to the imprecise orientation and position available, is the use of landmarks. It will be recalled that a landmark is a stationary observable point on the ground that is visible at large distances (water tower, bell tower, antenna, crossroads, bridge, building, etc.) and the geographical coordinates of which are accurately known. However:
  The researching and drawing up of lists of usable landmarks requires mission preparation, adding constraints that are not necessarily compatible with unplanned or rapid-response strikes.
  The operation/flight required to research/reconnoiter the intended landmark may prove to be resource-intensive.
  Simultaneous registration of the position of the sensor and the orientation of its LoS is not possible with a conventional "one-sight" registration on a single landmark, i.e. consisting in exploiting only one sight drawn on the landmark, the measurement then possibly being simply the orientation of the LoS or indeed the orientation-distance vector in the case of telemetry. This single-sight registration allows the orientation of the LoS to be registered in the case where the position of the sensor is known accurately, or the position of the sensor to be registered in the case where the orientation of the LoS (and the distance measured) is sufficiently accurate.
  One way of registering in succession the position of the sensor and the orientation of its LoS is to use 2 judiciously placed landmarks, one nearby (for example at 5 km) and the other further away (for example at 30 km). However, practical, accurately and judiciously placed landmarks are not necessarily available in every operational theater.
  The accuracy of the registration also depends on the exactitude with which the LoS is targeted on the landmark at the moment at which the measurement is taken. However, for example because of their shape or their context, not all landmarks necessarily lend themselves to being accurately tracked by a LoS.

SUMMARY OF THE INVENTION

The aim of the invention is to mitigate these drawbacks.
The solution according to the invention is based on the creation of one or more opportune landmarks directly in-flight using a georeferenced, planimetric and altimetric terrain database (terrain DB) without particular mission preparation.

More precisely, one subject of the invention is a method for geolocating an image sensor having an LoS and installed on board an aircraft.

It is mainly characterized in that the geographical position and the orientation of its LoS being approximate, it comprises:
  a step of creating at least one opportune landmark comprising the following substeps:
    an operator locating, on a screen for displaying acquired images, an observable stationary element on the ground, the axis of a telemeter being indicated in these images by means of a "reticle" type overlay the direction of which in the scene space represents the LoS of the image sensor;
    the operator moving the LoS in order to place the reticle marking the axis of the telemeter on this stationary observable element;
    tracking of this stationary element by tracking means;
    estimating the geographical position of this stationary element from ICCs delivered by a device able to determine them, this position also being approximate;
    on the basis of the approximate position of this tracked stationary element, searching in a terrain DB for the location corresponding to a zone centered on the approximately positioned stationary element, this zone being of preset size;
    displaying an image of the terrain of this location, said image being constructed from the terrain DB, the operator locating the observable element in this image; and
    the operator pointing to this observable element in the displayed terrain image, the geographical coordinates pointed to being retrieved from the terrain DB, this observable stationary element that the LoS is tracking thus becoming an opportune landmark; and the sensor (100) moving relative to the opportune landmark (95), a step of determining the accurate location of the sensor (100), from the geographical coordinates of this tracked opportune landmark (95), using a Kalman filter supplied with a plurality of measurements of the distance between the sensor and the opportune landmark and with a plurality of measurements of the orientation of the LoS of the sensor toward the opportune landmark, there being one orientation measurement for each telemetry measurement, simultaneously allowing the orientation of the LoS to be accurately estimated.

Thus, without any mission preparation, it is possible to opportunely create and use landmarks in-flight simply by making use of any observable stationary point (crossroads, building, etc.) that the LoS of the image sensor is capable of tracking.

In addition, given that this opportune landmark is "by construction" suitable for being tracked by the LoS, its use, which requires the LoS to be targeted thereon accurately at the moment when the one or more measurements are taken, will therefore necessarily be accurate.

According to a first feature of the invention, the geographical position of the tracked stationary element is approximately estimated following a telemetry distance measurement that complements the ICCs.

According to one feature of the invention, the displayed image obtained from the terrain DB is a terrain image projected depending on the ICCs.

According to another feature of the invention, it comprises a step of displaying the projected acquired image depending on the ICCs in order to obtain a real orthoimage.

The step of creating the opportune landmark advantageously comprises a step of marking on the displayed terrain image, the imprint on the ground of the acquired image. Optionally, it also comprises a step of displaying the overall situation: terrain image showing the entirety of the geographical zone encompassing the positions of the sensor and the point tracked on the ground, these positions, the LoS and the imprint on the ground of the acquired image being, based on the ICCs available on-board, represented in this terrain image.

The terrain image is advantageously manually movable laterally in latitude/longitude and is zoomable and dezoomable.

Another subject of the invention is a method for locating a target using a geolocated on-board sensor such as described, characterized in that it comprises a step of locating the target relative to the sensor.

The invention also relates to a processing unit comprising means for implementing the locating method such as described, and also relates to an image sensor having an LoS and comprising:

an imager able to acquire images, having an optical axis and intended to be installed on board an aircraft;

a telemeter harmonized with the optical axis of the imager and intended to be installed on board the aircraft, the optical axis of the telemeter being the LoS of the sensor;

a tracking means intended to be installed on board the aircraft, allowing the LoS to remain targeted on a stationary element on the ground;

a device able to determine the image capture conditions (ICCs) of the sensor, i.e. at least its geographical position and the orientation of its LoS, and intended to be installed on board the aircraft;

and equipped with:

a display device for displaying in real time acquired images, the axis of the telemeter being indicated in these images by means of a "reticle" the direction of which in the scene space represents the LoS of the image sensor;

a device allowing an operator to move the orientation of the LoS;

a georeferenced, altimetric, planimetric terrain DB;

a device for displaying a zone of the terrain DB, said device being equipped with a pointer able to be controlled by the operator by way of means for controlling the pointer; and a processing unit connected to the preceding elements such as indicated above.

The display device and/or the device allowing an operator to move the orientation of the LoS, and/or the terrain DB, and/or the device for displaying a zone of the terrain DB, and/or the processing unit may be remote or intended to be installed on board the aircraft.

BRIEF DESCRIPTION OF THE DRAWINGS

Other features and advantages of the invention will become apparent on reading the following detailed description given by way of nonlimiting example and with reference to the appended drawings, in which:

FIGS. 3a to 3c illustrate the creation of a opportune landmark, these illustrations using data obtained from the IGN site "Géoportail3D", with, in each of the figures, an acquired image on the right-hand side, and, on the left-hand side, an overall view (FIG. 3a); a terrain image without projection, corresponding to the dezoomed and zoomed image acquired and obtained from the DB (FIG. 3b); and a terrain image, corresponding to the dezoomed and zoomed image acquired and obtained from the DB, and projected depending on the ICCs of the acquired image (FIG. 3c); and FIG. 4 illustrates a multi-telemetry/angulation embodiment.

DETAILED DESCRIPTION

Figure 1:
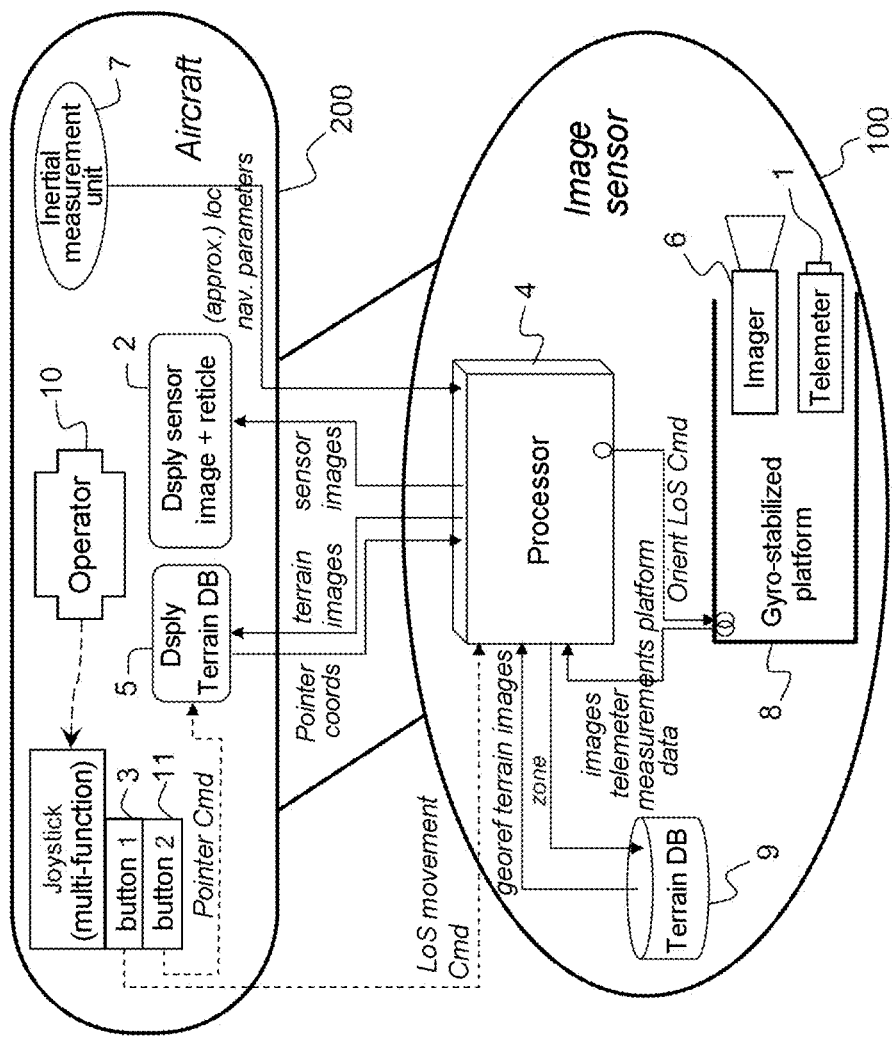
FIG. 1 schematically shows an exemplary device according to the invention.
Figure 2:
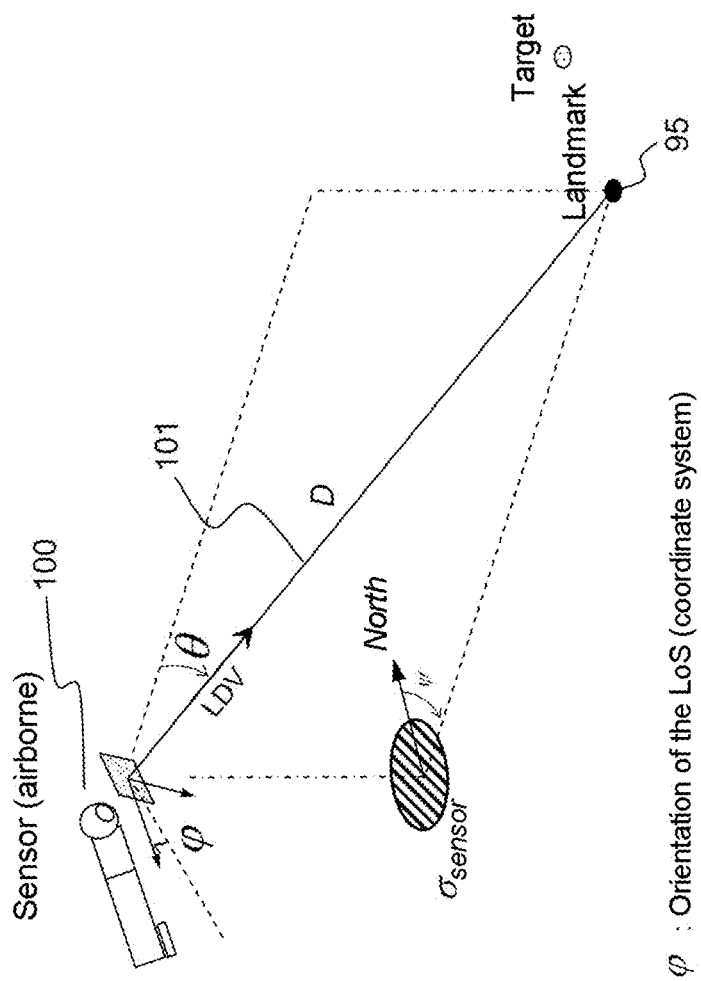
FIG. 2 schematically shows an exemplary sensor able to implement the method according to the invention, and illustrates the angles used in the method according to the invention.

The image sensor 100 described with regard to FIGS. 1 and 2, comprises:

an imager 6 able to acquire images, said imager 6 having an optical axis and being intended to be installed on board the aircraft 200;

a laser telemeter 1 harmonized with the optical axis of the imager, and intended to be installed on board the aircraft, the telemeter and the imager being fastened to a gyro-stabilized platform 8, the optical axis of the telemeter being the LoS of the sensor;

a display device 2 for displaying in real time images acquired in-flight, the axis of the telemeter being indicated in these images by means of a "reticle" the direction of which in scene space represents the LoS of the image sensor;

a device such as an inertial measurement unit 7, able to determine, with the processing unit, the image capture conditions (ICCs) of the sensor, i.e. at least its geographical position and the orientation of its LoS. Usable inputs include the outputs of the inertial measurement unit 7 and the angular feedback of the gyro-stabilized platform 8 supporting the optical sensors of the imager 6 and the telemeter 1;

a device 3, for example a joystick, allowing an operator to move the orientation of the LoS;

a tracking means, intended to be installed on board an aircraft, allowing the LoS to remain targeted on a stationary element 95 on the ground, for example comprising an image deviation meter working in real-time with the acquired images, and delivering deviations that are fed into a feedback loop that corrects the orientation of the platform 8 supporting the telemeter and imager, thus allowing the LoS to continue to track this stationary point;

a processing unit 4 (computer) optionally incorporating the tracking means, able to:

deliver continuously a geographical position of the sensor and an orientation of its LoS. Usable inputs include the outputs of the navigation of the aircraft (inertial measurement unit 7) and the angular feedback of the gyro-stabilized platform 8 supporting the imager and the telemeter. The expression "orientation of the LoS" must be understood to mean the 3 Euler angles ($\psi$, $\theta$, $\varphi$) defining the orientation in space (or "attitude") of a three-dimensional coordinate system associated with the LoS and with the sensor, as may be seen in FIG. 2;

deliver LoS orientation setpoints, notably in tracking mode, on the basis of processing of the acquired images; and perform calculations associated with the MTA-KF method described below, using a Kalman filter supplied with telemetry and LoS orientation measurements, said method being implemented during phases of tracking a stationary point;

a georeferenced altimetric and planimetric terrain DB 9 optionally integrated into the sensor 100, as shown in the example in the figure, and able to be exploited by the processing unit 4; and a device 5 for displaying a zone of the exploited terrain DB, said device being equipped with a pointer able to be controlled by the operator via control means 11 and thus moved manually in the terrain image by the operator.

FIG. 1 is nonlimiting in terms of the possible locations of the various elements. It illustrates the example of an optronic pod fastened under the aircraft and including the sensor 100, but the image sensor could equally well be integrated into the aircraft 200. The operator, the display device and/or the device allowing an operator to move the orientation of the LoS, the terrain DB, the device for displaying a zone of the terrain DB, and/or part of the computer could also be on the ground, with a data connection between a ground station and the aircraft.

The method according to the invention aims to improve the accuracy of the geographical position and orientation of the LoS of the sensor relative to an available inaccurate geographical position (corrupted by an error typically comprised between 100 m and 1000 m), the orientation of its LoS also possibly being inaccurate (corrupted by an error typically comprised between 3 and 10 mrd). This is achieved by:

creating at least one opportune landmark without mission preparation, then subsequently, accurately locating the sensor based on the geographical coordinates of this landmark and on at least one measurement of the distance between the sensor and this tracked landmark.

Figure 3A:
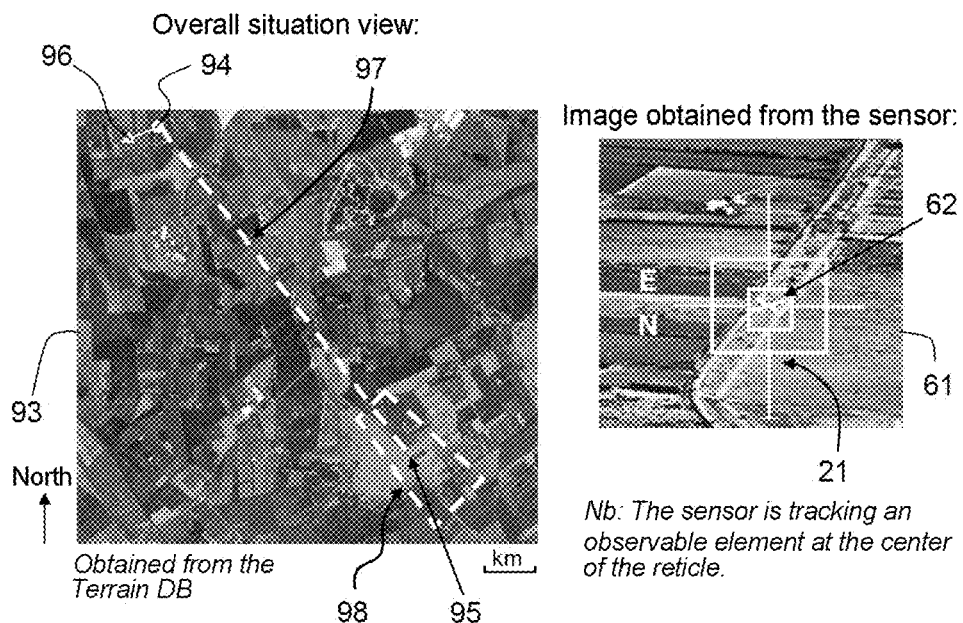
Figure 3B:
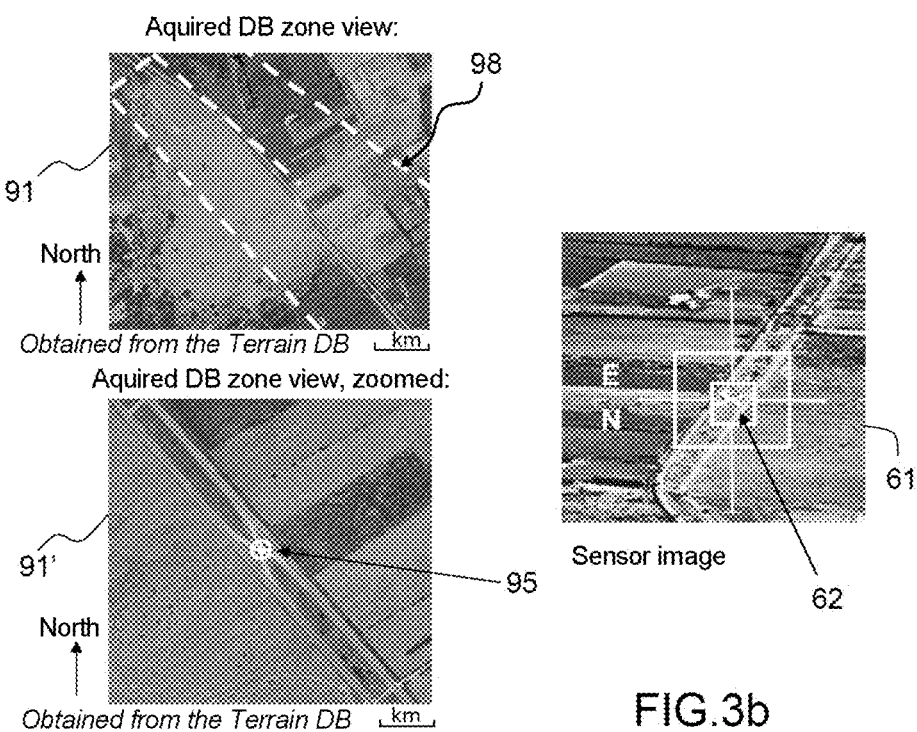

The step of creating an opportune landmark comprises the following substeps, which are described with regard to FIGS. 3a to 3c:

an operator locating an observable stationary element on the ground on the screen 2 for displaying acquired images 61 (as shown in FIG. 3a), the observable element 62 possibly being a crossroad, an intersection between two linear elements, an isolated building or feature, etc.;

the operator 10 manually moving the LoS (using a joystick 3) in order to position the axis of the laser telemeter marked by the reticle 21 on this observable stationary element 62;

tracking of this stationary element 62 by the LoS of the sensor 100 via the tracking means, for example comprising an image deviation meter working in real time with the acquired images, and delivering deviations that are fed into a feedback loop that corrects the orientation of the platform 8, thus allowing the LoS to continue to track this stationary element;

estimating the approximate geographical position of this stationary element from ICCs (sensor position plus sensor-tracked point vector) and optionally a telemetry distance measurement; as the position and LoS orientation of the sensor 100 are imprecise, so is the resulting position estimated from the tracked stationary point;

based on the approximate position of this stationary element 62 and on a preset size of a zone centered on the stationary element (zone calculated from the field of view of the imager 6 and the uncertainty in the position of the stationary point 62), the processing unit 4 searching in the terrain DB 9 for the location corresponding to this zone (as shown in FIG. 3b) and generating and displaying the georeferenced terrain image 91 of this zone, optionally with the possibility of "zooming" (as shown in FIG. 3b with the terrain image 91') and of "dezooming" this image centered on the estimated position of the stationary point;

optionally, for example for the sake of operator comfort, displaying a view of this terrain image 92 projected depending on the ICCs in order to make it visually similar to the acquired image 61, as shown in FIG. 3c, and thus make comparison of these two images 61, 92 easier; this projected terrain image 92 may also be zoomed (as shown in FIG. 3c with the terrain image 92') or dezoomed. According to an alternative, this approach may be reversed, the projected acquired image being displayed depending on the ICCs in order to obtain a real orthoimage comparable to the terrain image;

optionally, overlaying on the displayed terrain image the imprint 98 on the ground of the image sensor 61, on the basis of projection of the field of view of the imager 6 onto the terrain;

optionally, and again with the aim of facilitating the task of the operator 10, displaying a laterally movable "zoomable" and "dezoomable" overall view 93 (shown in FIG. 3a) of a terrain image of an enlarged zone including the estimated positions of the sensor 94 and of the tracked stationary point 95 (therefore corresponding to the stationary point 62 in the image obtained from the sensor) and the direction 96 of the route of the aircraft, the LoS 97 and the imprint 98 on the ground of the image sensor, all these various items of information being overlaid on the overall terrain image 93;

locating the observable stationary element 95 which the sensor 100 is tracking in the terrain image (either the projected image 92 or the not projected image 91), this locating operation being facilitated when both images, namely the image 91 or 92 obtained from the terrain DB and the actual image (oblique 61 or orthoimage view) from the sensor are available; this locating operation may be carried out by the operator 10 possibly assisted by an image recognition device;

then after the operator has pointed, using means 11 for controlling the pointer, to the sensor-tracked observable element 95 located in the terrain image 92' (or 92 or 91'), or has validated the result of the image recognition, the processing unit 4 retrieving from the terrain DB 9 the geographical coordinates (latitude, longitude, height) of the element 95 pointed to, this element 95 thus becoming an opportune landmark, the accuracy of the coordinates of which depends only on the quality of the exploited terrain DB.

This landmark creation is based on the use of terrain data for example provided by the "Geobase Defense" database, which comprises two components:

a level 2 DTM (digital terrain model), i.e. a model with a resolution of approximately 30 m (in the DLMS/DTED 2 format), containing the altitudes of the terrain; and level 2 orthoimages with a resolution of about 5 m (in the GEOTIFF format), in the ARC on WGS84 representation system.

The step of precisely locating the sensor 100 is then calculated on the basis of the geographical coordinates of this tracked opportune landmark 95 and of at least one distance between the sensor and this landmark, as measured by the telemeter 1. A plurality of embodiments may be envisioned, the objective of course being to "reproduce" at the sensor level the good accuracy of the landmark.

According to a first embodiment, the position of the sensor is imprecise but the orientation of its LoS is known with sufficient accuracy.

The step of accurately locating the sensor may then be carried out using a direct method based on the accurate geographical position of the opportune landmark and the landmark-sensor vector. The direction of the vector is given by accurate knowledge of the orientation of the LoS and its norm is obtained by telemetry (accurate by nature), a single telemetry measurement being enough. The vector is evaluated at the date of the telemetry, meaning that the position obtained for the sensor is also that corresponding to the date of the telemetry. The difference, at the date of the telemetry, observed between the estimated position of the sensor before the measurement and the position calculated using the measurement is used to correct ("register") the current position of the sensor, the assumption being that this difference is constant, i.e. that the sensor position error is constant, at least between the date of the telemetry and the current date, at which the correction is carried out.

This method, using telemetry and the orientation of the LoS to determine the sensor-landmark vector, is direct and instantaneous. Its accuracy, which decreases linearly as a function of the distance between the sensor and the landmark, is thus limited by LoS orientation errors that, although in this case are assumed to be accurate, are not zero, and to a lesser extent by the accuracy of the distance measurement.

According to a second embodiment, the position and the orientation of the LoS are imprecise, but the sensor is near to the landmark. The term "near" is understood to mean that the angular error in its LoS multiplied by the distance to the landmark generates a positional error that is negligible with respect to the positional accuracy desired for the sensor. The step of accurately locating the sensor may then be carried out as above using a direct method based on the accurate geographical position of the opportune landmark and of the sensor-landmark vector obtained by telemetry, a single telemetry measurement being enough.

According to a third embodiment, the position and the orientation of its LoS are imprecise, but the sensor is moving relative to the opportune landmark. The step of accurately locating the sensor may then be carried out using a time integration method.

Time integration methods require a stationary point the geographical coordinates of which are known, in the present case the opportune landmark, to be tracked; they then exploit the succession of angular measurements (also called angulations) and/or distance measurements to this point carried out during the course of the movement of the aircraft. These methods may, on the one hand, provide an estimate of the geographical position of the sensor, and, on the other hand, for certain thereof, allow angular bias to be identified in its determined LoS orientation, notably making it possible to improve the subsequent geolocation of targets using the sensor.

Various time integration (or multi-measurement) methods are known:

multi-telemetry methods that use only telemetry measurements;

multi-angulation methods that use only orientation measurements of the line of sight; and multi-telemetry/angulation (MTA) methods that simultaneously exploit both types of measurement, i.e. measurements of angle and distance.

In each of these methods, the position of the tracked landmark is also used as a measurement.

Furthermore, they all start from a first estimation of the position of the sensor, which it is then sought to refine by filtering as the landmark is tracked.

It will be recalled that observability is the ability to make measurable the variables that it is sought to estimate.

The final accuracy of the location of the sensor and of the estimate of angular bias affecting the LoS depends on the observability afforded by the scenario, i.e. the trajectory of the aircraft relative to the tracked landmark and the spatial distribution of the angular and/or distance measurements, and therefore indirectly also on the length of time for which this landmark is tracked. It will be noted that depending on whether angular or distance measurements are used, the ideal scenario observability is not the same.

Multi-Telemetry Method:

This method is based on knowledge of a plurality of aircraft-landmark distance measurements obtained by telemetry. Since measurement of the LoS orientation is not used in the estimation of the position of the sensor, its main advantage is therefore that it is independent of LoS attitude errors. In contrast, it requires constraints to be placed on trajectory in order to enable observability, a simple rectilinear airplane trajectory being inadequate.

Multi-Angulation Method:

The multi-angulation method consists in using only LoS orientation measurements.

It may be implemented using a Kalman filter (KF) the operating principle of which is the following:

the orientation of the LoS tracking the landmark is measured; and this measurement is compared to an orientation estimated on the basis of the position of the landmark and of the current estimated position of the sensor.

The observability is given by the variation in the difference between the LoS effectively slaved to the landmark and the LoS known on board. However, this difference is related to the positioning error of the sensor, assumed to be of the bias type, thereby allowing it to be estimated. The observability depends on the trajectory of the airplane, and is better for trajectories allowing a spatially varied distribution of measurements to be taken.

Given that the LoS is continually slaved to the landmark, the rate at which measurements can be taken is limited only by the rate at which the orientation of the LoS can be calculated, which may be advantageous when the angular measurements are noisy.

It will be noted that relative to multi-telemetry, this method is passive and therefore has the advantage of being discreet.

Multi-Telemetry/Angulation (MTA) Method:

The observability conditions on the multi-telemetry and multi-angulation methods are not the same. In addition, multi-telemetry and multi-angulation both allow the sensor to be located; associating the two methods adds additional constraints to the solution, and thus allows the angular bias in on the orientation of the LoS to be estimated.

These two methods are therefore complementary, leading methods referred to as MTA methods, which use both the orientation of the LoS and telemeter-measured distances, when they are available, to be sought.

Among possible MTA methods, a Kalman filter based method (called the MTA-KF method) is preferably used, the latter being fed with distance measurements at a rate for example of 0.5 Hz, when discretization constraints allow it, and with LoS orientations at a rate for example of 10 Hz; there is one angular measurement to each telemetry measurement, the other angular measurements being taken between the telemeter measurements as illustrated in FIG. 4.

If angular measurements alone are used, the method simplifies to the preceding (multi-angulation) case. To use measurements coupling telemetry and angulation, it is in fact a question of using successively measured landmark-sensor vectors. To each new measured landmark-sensor vector is compared the same vector calculated on the basis of the current estimated sensor position and LoS orientation.

The observability is given by the variation in the difference between the landmark-sensor vector that is effectively slaved to the landmark and this vector known on board. However, as above, this difference is related to the positional error of the sensor, but also to errors in the orientation of the LoS, all these errors being assumed to be of the bias type, which is generally the case, thereby allowing them to be estimated.

The vector state of the KF comprises at least:
3 states for the position of the sensor;
3 states for the LoS attitude; and
1 state for the sensor-landmark distance.

This KF-based method delivers, in addition to an estimate of the location of the sensor, a confidence in this estimation based on the covariance matrix of the estimations.

This MTA-KF method thus has the advantage of registering simultaneously the position of the sensor and the orientation of its LoS, using a single tracked landmark, and of not truly constraining the trajectory of the aircraft relative to the landmark, a rectilinear trajectory being suitable. The length of time the landmark needs to be tracked for to obtain a good convergence of the KF states, and therefore an accurate estimation of the position of the sensor and the LoS attitude, hardly exceeds about twenty seconds.

Once the sensor has been accurately located and its LoS attitude is known with accuracy, it may in turn be used to precisely locate a target. The orientation of the LoS, which was pointed toward the opportune landmark, is changed in order now to sight the target. It is then a case of autonomous target location by an airborne sensor, the position of the sensor and the sensor-target vector being known. The direction of the vector is obtained from knowledge of the orientation of the LoS and of its norm, which is obtained either directly by telemetry or indirectly using a ray tracing method in a DTM. It will be noted that if the target is near the landmark, the location obtained for the target will have practically the accuracy of the landmark, i.e. the accuracy of the terrain DB, even without telemetry. It is operationally advantageous to estimate angular errors affecting the LoS because this allows this target to be geolocated with a good accuracy merely using a "one-sight" mode with telemetry.

The invention claimed is:

1. A method for geolocating an image sensor having a line of sight and installed on board an aircraft, characterized in that the geographical position of the sensor and the orientation of its a line of sight being approximate, it comprises:
a step of creating at least one opportune landmark comprising the following substeps:
an operator locating, on a screen for displaying acquired images, an observable stationary element, on the ground the axis of a telemeter being indicated in these images by means of a "reticle" type overlay the direction of which in the scene space represents the line of sight of the image sensor;
the operator moving the line of sight in order to place the reticle marking the axis of the telemeter on this stationary observable element;
tracking of this stationary element by tracking means;
estimating the geographical position of this stationary element from image capture conditions delivered by a device able to determine them, this position also being approximate;
on the basis of the approximate position of this tracked stationary element, searching in a terrain database for the location corresponding to a zone centered on the approximately positioned stationary element, this zone being of preset size;
displaying an image of the terrain of this location, said image being constructed from the terrain database, the operator locating the observable element in this image; and
the operator pointing to this observable element in the displayed terrain image, the geographical coordinates pointed to being retrieved from the terrain database, this observable stationary element that the line of sight is tracking thus becoming an opportune landmark; and
the sensor moving relative to the opportune landmark, a step of determining the accurate location of the sensor, from the geographical coordinates of this tracked opportune landmark, using a Kalman filter supplied with a plurality of measurements of the distance between the sensor and the opportune landmark and with a plurality of measurements of the orientation of the line of sight of the sensor toward the opportune landmark, there being one orientation measurement for each telemetry measurement, simultaneously allowing the orientation of the line of sight to be accurately estimated.

2. The method for geolocating an on-board sensor as claimed in claim 1, wherein the approximate geographical position of the tracked stationary element is estimated following a telemetry distance measurement that complements the image capture conditions.

3. The method for geolocating an on-board sensor as claimed in claim 1, wherein the displayed image obtained from the terrain database is a terrain image projected depending on the image capture conditions.

4. The method for geolocating an on-board sensor as claimed in claim 1, further comprising a step of displaying the projected acquired image depending on the image capture conditions in order to obtain a real orthoimage.

5. The method for geolocating an on-board sensor as claimed in claim 1, wherein the step of creating an opportune landmark comprises a step of marking on the displayed terrain image, the imprint on the ground of the acquired image.

6. The method for geolocating an on-board sensor as claimed in claim 1, further comprising a step of displaying the terrain image showing the overall situation of the entirety of the geographical zone encompassing the positions of the sensor and the point tracked on the ground, these positions, the line of sight and the imprint on the ground of the acquired image being, based on the image capture conditions available on-board, represented in this terrain image.

7. The method for geolocating an on-board sensor as claimed in claim 1, wherein the terrain image is moved laterally in latitude/longitude and/or "zoomed" or "dezoomed".

8. A method for locating a target using a geolocated on-board sensor as claimed in claim 1, further comprising a step of locating the target relative to the sensor.

9. A processing unit comprising means for implementing the locating method as claimed in claim 1.

10. An image sensor having a line of sight and comprising:
an imager able to acquire images, having an optical axis and intended to be installed on board an aircraft;
a telemeter harmonized with the optical axis of the imager and intended to be installed on board the aircraft, the optical axis of the telemeter being the line of sight of the sensor;
a tracking means intended to be installed on board the aircraft, allowing the line of sight to remain targeted on a stationary element on the ground;
a device able to determine the image capture conditions of the sensor, i.e. at least its geographical position and the orientation of its line of sight, and intended to be installed on board the aircraft;
and equipped with:
a display device for displaying in real time acquired images, the axis of the telemeter being indicated in these images by means of a "reticle" the direction of which in the scene space represents the line of sight of the image sensor;
a device allowing an operator to move the orientation of the line of sight;
a georeferenced, altimetric, planimetric terrain database;
a device for displaying a zone of the terrain database, said device being equipped with a pointer able to be controlled by the operator by way of means for controlling the pointer; and
a processing unit as claimed in claim 9, connected to the preceding elements.

11. The image sensor as claimed in claim 10, wherein the display device and/or the device allowing an operator to move the orientation of the line of sight, and/or the terrain database, and/or the device for displaying a zone of the terrain database, and/or the processing unit are remote or intended to be installed on board the aircraft.

* * * * *